US008186933B2

(12) United States Patent
Doss et al.

(10) Patent No.: US 8,186,933 B2
(45) Date of Patent: May 29, 2012

(54) SYSTEMS, METHODS, AND APPARATUS FOR PASSIVE PURGE FLOW CONTROL IN A TURBINE

(75) Inventors: Jeyamani M. Doss, Bangalore (IN); Subodh D. Deodhar, Bangalore (IN); Hari K. Meka, Bangalore (IN)

(73) Assignee: General Electric Company, Schenectady, NY (US)

( * ) Notice: Subject to any disclaimer, the term of this patent is extended or adjusted under 35 U.S.C. 154(b) by 685 days.

(21) Appl. No.: 12/409,641

(22) Filed: Mar. 24, 2009

(65) Prior Publication Data
US 2010/0247282 A1  Sep. 30, 2010

(51) Int. Cl.
*F01D 11/18* (2006.01)
(52) U.S. Cl. ........................................................ 415/1
(58) Field of Classification Search .............. 415/1, 115, 415/116, 134, 178, 174.1, 174.2; 60/226.1, 60/226
See application file for complete search history.

(56) References Cited

U.S. PATENT DOCUMENTS

| | | | | |
|---|---|---|---|---|
| 4,023,919 A * | 5/1977 | Patterson | ........................ | 415/134 |
| 4,445,815 A * | 5/1984 | Fortmann | ........................ | 415/12 |
| 5,316,437 A * | 5/1994 | Czachor | ........................ | 415/115 |
| 5,839,267 A * | 11/1998 | Schonewald et al. | ........... | 60/772 |
| 6,077,035 A * | 6/2000 | Walters et al. | ................. | 415/115 |
| 6,746,208 B2 * | 6/2004 | Marushima et al. | ......... | 416/96 R |
| 6,779,967 B2 * | 8/2004 | Friedl et al. | ...................... | 415/26 |
| 6,942,445 B2 * | 9/2005 | Morris et al. | ...................... | 415/1 |
| 7,090,459 B2 * | 8/2006 | Bhate et al. | ........................ | 415/1 |
| 7,131,814 B2 * | 11/2006 | Nagler et al. | ................... | 415/116 |
| 7,347,661 B2 * | 3/2008 | Phipps et al. | .................. | 415/108 |
| 7,993,102 B2 * | 8/2011 | Desai et al. | .................. | 416/97 R |
| 8,016,297 B2 * | 9/2011 | Heinemann et al. | .......... | 277/644 |
| 8,038,399 B1 * | 10/2011 | Liang | .............................. | 416/95 |
| 8,057,157 B2 * | 11/2011 | Roush et al. | ...................... | 415/1 |
| 2001/0025476 A1 * | 10/2001 | Eldrid et al. | ................. | 60/39.02 |

FOREIGN PATENT DOCUMENTS
AU  2005201224 A1  10/2005
* cited by examiner

*Primary Examiner* — Alexander Gilman
(74) *Attorney, Agent, or Firm* — Sutherland Asbill & Brennan LLP

(57) ABSTRACT

Systems, methods and apparatus for passive purge flow control in a turbine are provided. Various embodiments of the invention include providing a path for air to flow to a bore of a rotor with a plurality of stacked wheels. The air flow path includes at least one inlet hole on a rotor structure and a plurality of holes in at least some of the stacked wheels. The method further involves control of air flow to the at least one inlet hole based at least in part on axial deflection between the rotor and an associated stator during the gas turbine operation. Additionally, a portion of the air flowing into the inlet hole is directed through the plurality of holes in the at least some of the stacked wheels to purge the rotor.

20 Claims, 5 Drawing Sheets

SYSTEMS, METHODS, AND APPARATUS FOR PASSIVE PURGE FLOW CONTROL IN A TURBINE

FIELD OF THE INVENTION

Embodiments of the invention relate generally to turbines and more specifically, to systems, methods, and apparatus for passive purge flow control in a turbine.

BACKGROUND OF THE INVENTION

Turbines typically comprise a rotating part such as the rotor, and a stationary part such as a stator. The rotor of a turbine may include a plurality of stacked wheels. The outer radial region of the stacked wheels is known as rim portion while the central radial region of the stacked wheels is known as the bore portion. Typical operation of turbines involves high temperatures which can subject the various components of the turbine to relatively extreme thermal loads. The rim portion of a rotor of a gas turbine is typically exposed to a high temperature gas flow, and therefore, is heated to relatively high temperatures compared to the bore portion of the rotor during start up, thus generating a significant radial thermal gradient between the rim and the bore of the rotor. This rim-to-bore thermal gradient causes stress cycling during startup and shutdown cycle of gas turbine and thereby adversely affects the life of the mechanical components of the turbine.

Moreover, typically in turbine rotor construction, a plurality of solid and annular wheels are placed in adjacent positions, and are secured to one another by a plurality of axially extending bolts and rabbeted joints provided between the adjacent wheels. Thus, differential heating of the wheels can cause significant rotor bore stresses and deflections which tend to open up the rabbeted joints. Moreover, the thermal conditions of the rotor and the associated wheels are different at startup, steady state operation, and turbine shutdown. During startup, the rim portion of the turbine wheels are typically in direct contact with the hot turbine flow path, and therefore, the rim portion tends to heat up faster than the bore portion, resulting in a relatively high temperature gradient. During steady state operation, heat from the rim portion is conducted to the bore portions, reducing the temperature gradient, and nearly equalizing the temperature differential between the rim and the bore. However, since the rim remains in direct contact with the hot gases, the temperature of the rim tends to be slightly elevated compared to the temperature of the bore, even at steady state. During shutdown, the temperature gradient tends to reverse because the reduced flow path temperature of the compressor section of turbine cools the rim portion, whereas the bore portion still retains the heat because of thermal inertia.

Thus there is a need for a design in which flow path or heated/cooled air can be directed to the turbine bore during respective startup and shutdown, and it can either be shutoff or drastically reduced during steady state operation. Accordingly, there is a need for methods, systems and apparatuses for passive purge flow control in a turbine.

BRIEF DESCRIPTION OF THE INVENTION

Embodiments of the invention can address some or all of the above needs. Certain embodiments of the invention can provide systems, methods, and apparatus for passive purge flow control in a turbine. According to one embodiment of the invention, there is disclosed a method for control of radial temperature gradients in a rotor of a gas turbine. The method may include providing a path for air to flow to a bore of the rotor, which includes a plurality of stacked wheels. The air flow path may include at least one inlet hole on a rotor structure and a plurality of holes in at least some of the stacked wheels. The method may further involve control of air flow to the at least one inlet hole based at least in part on axial deflection between the rotor and an associated stator during the gas turbine operation. Additionally, a portion of the air flow flowing into the inlet hole may be directed through the plurality of holes in the at least some of the stacked wheels.

According to another embodiment of the invention, there is disclosed a system for controlling radial temperature gradients in a rotor of a gas turbine. The system may include an air flow path provided to a bore of the rotor which includes a plurality of stacked wheels. The air flow path may include at least one inlet hole on a rotor structure and a plurality of holes in the stacked wheels. The system may further include a sealing device operable to control air flow to the at least one inlet hole based at least in part on axial deflection between the rotor and an associated stator during the gas turbine operation. Additionally, at least a portion of the air flow flowing into the at least one inlet hole may be directed to purge at least one wheel through the plurality of holes in the stacked wheels.

According to yet another embodiment of the invention, there is disclosed an apparatus for controlling radial temperature gradients in a rotor of a gas turbine. The apparatus may include an air flow path provided to a bore of the rotor which includes a plurality of stacked wheels. The air flow path to the bore of the rotor may include at least one inlet hole on a rotor structure and a plurality of holes in the stacked wheels of the rotor. The apparatus may further include a sealing device for controlling air flow to the at least one inlet hole based at least in part on axial deflection between the rotor and an associated stator during operation of the gas turbine. Additionally, at least a portion of the air flow may be directed to purge at least one wheel through the plurality of holes in the stacked wheels.

Other embodiments, aspects, and features of the invention will become apparent to those skilled in the art from the following detailed description, the accompanying drawings, and the appended claims.

BRIEF DESCRIPTION OF THE DRAWINGS

Figure 1:
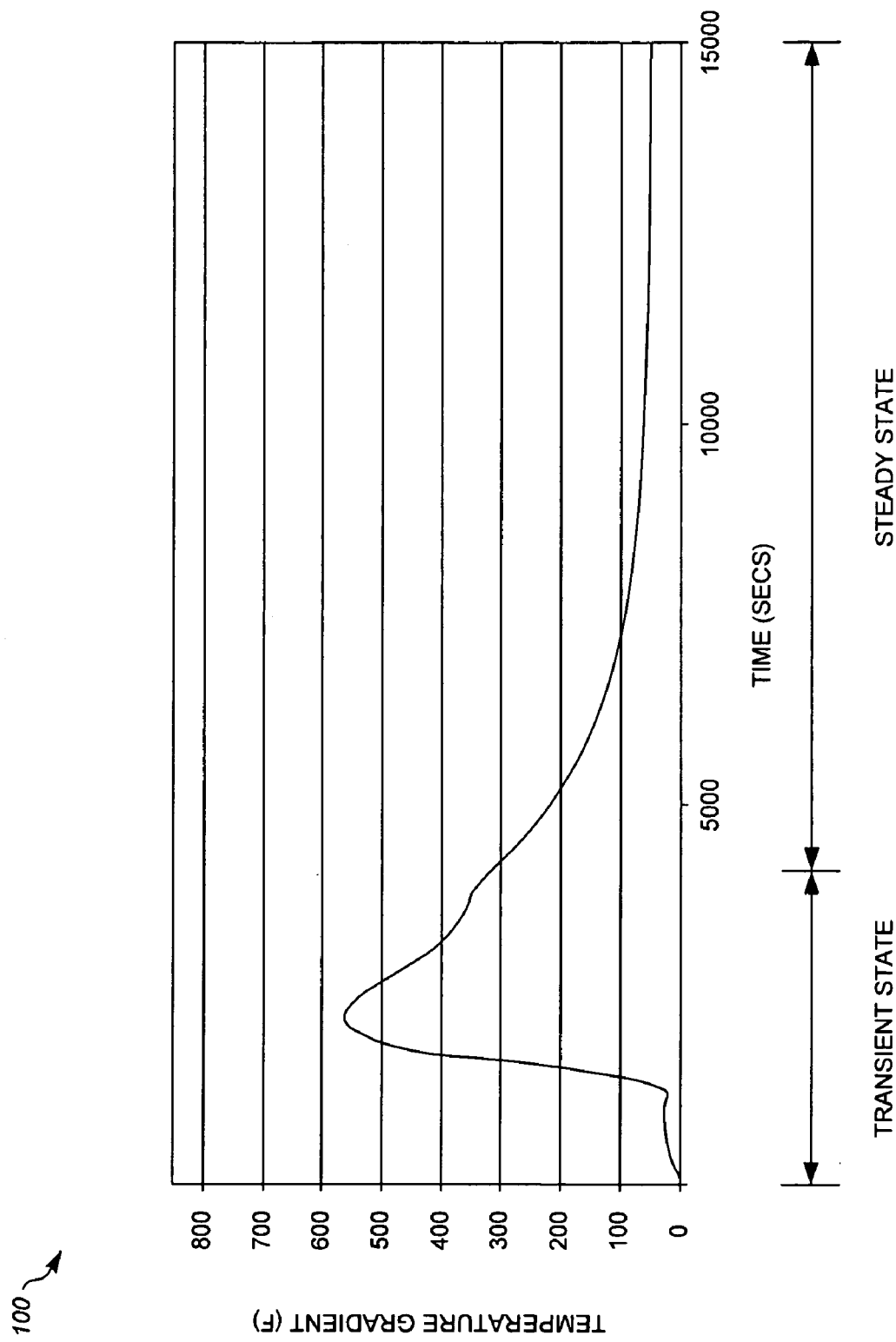

Having thus described the invention in general terms, reference will now be made to the accompanying drawings, which are not necessarily drawn to scale, and wherein:

FIG. 1 is a diagram illustrating one example of a change in the rim to bore temperature gradient associated with a rotor of a gas turbine according to an illustrative embodiment of the invention.

Figure 2:
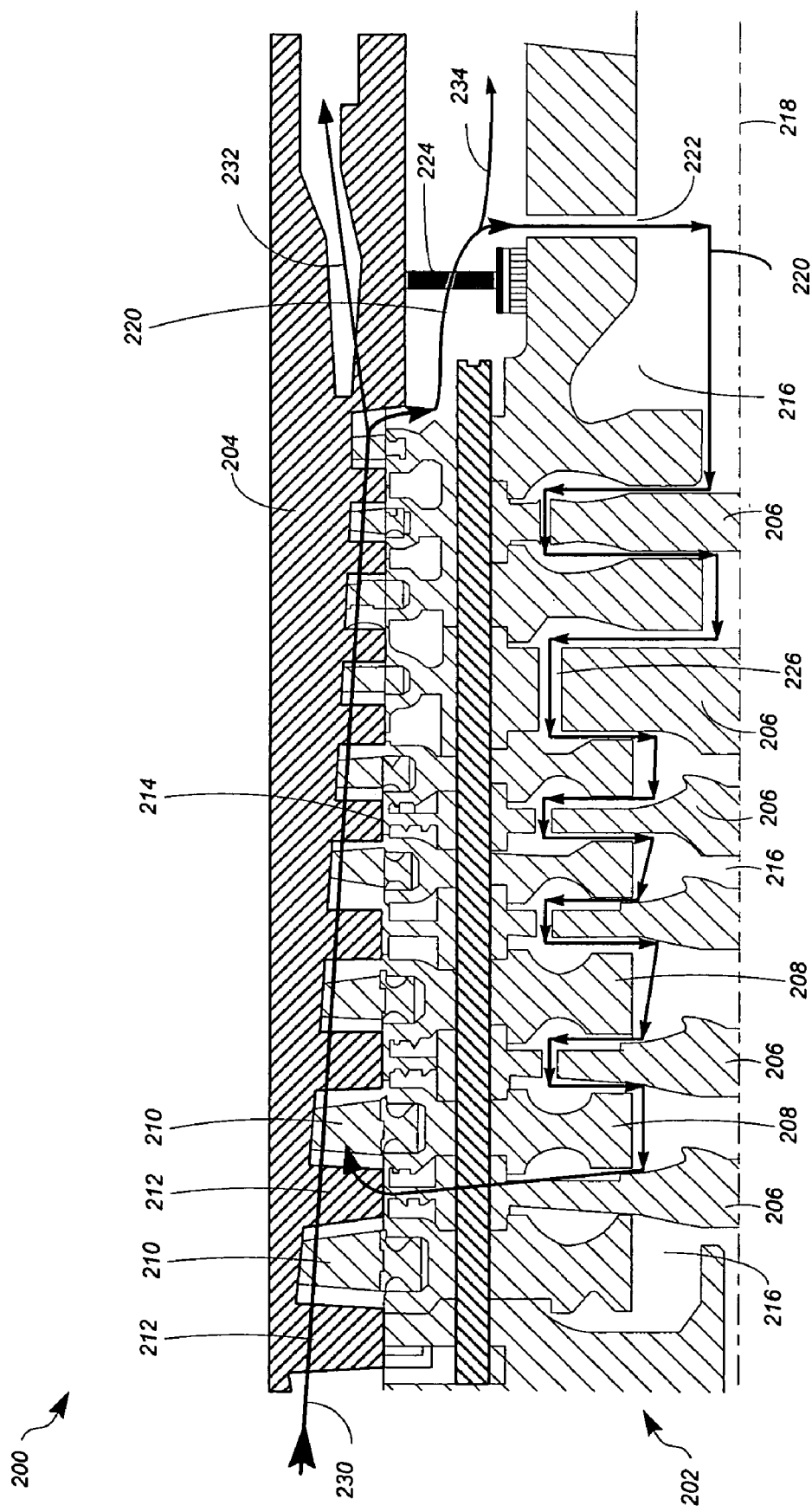

FIG. 2 is a partial cross-sectional side view of one example compressor section of a gas turbine that may be utilized in accordance with various embodiments of the invention.

Figure 3:
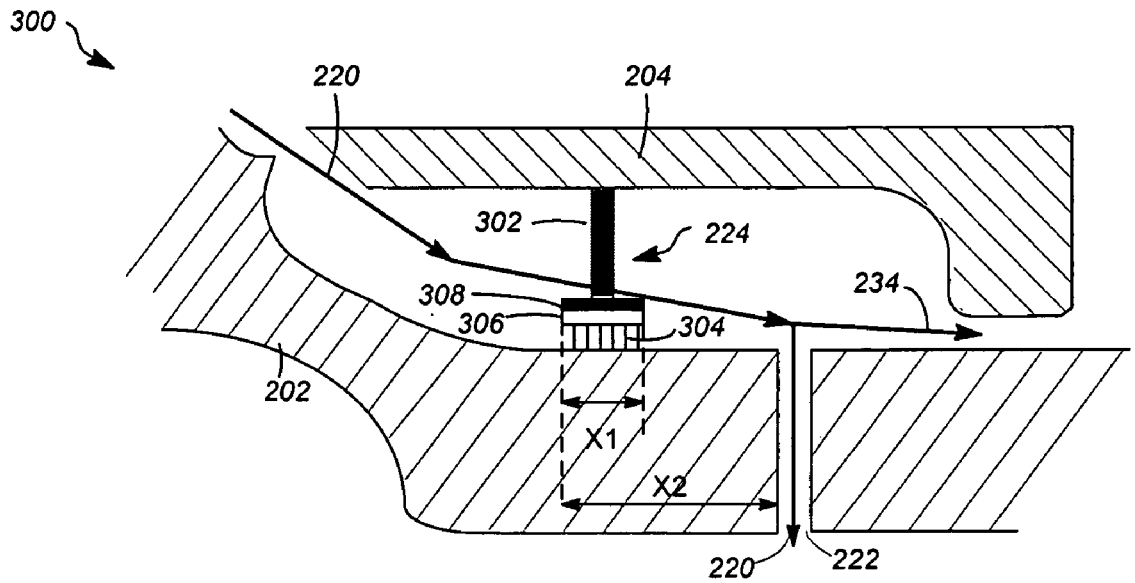

FIG. 3 is a magnified cross-sectional side view of a part of a turbine section in which control of purge flow is achieved, in accordance with an embodiment of the invention.

Figure 4:
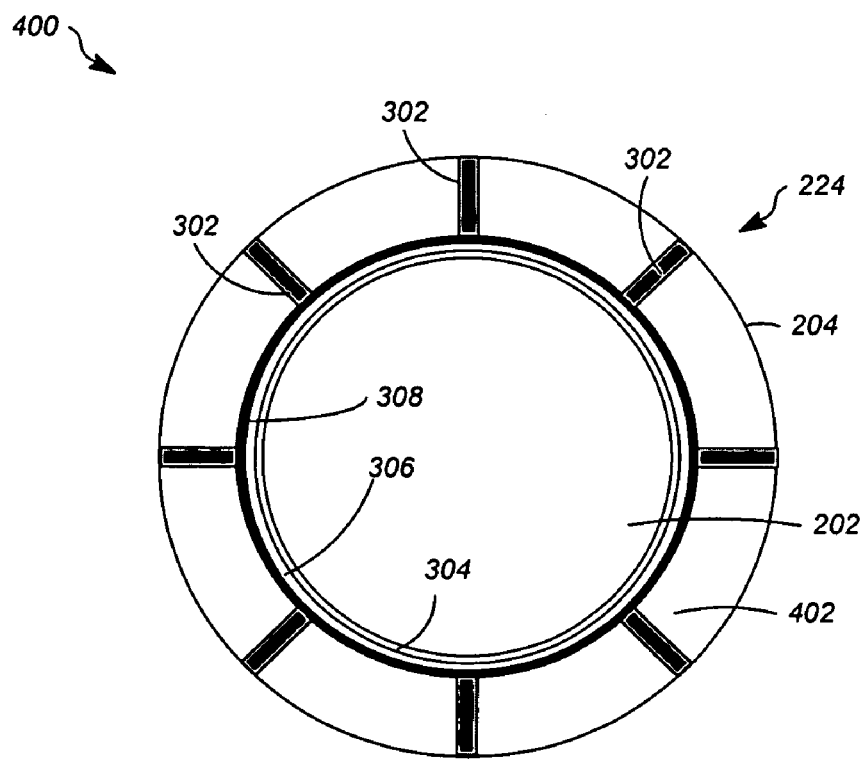

FIG. 4 is a schematic front view of one example sealing device, in accordance with an embodiment of the invention.

Figure 5:
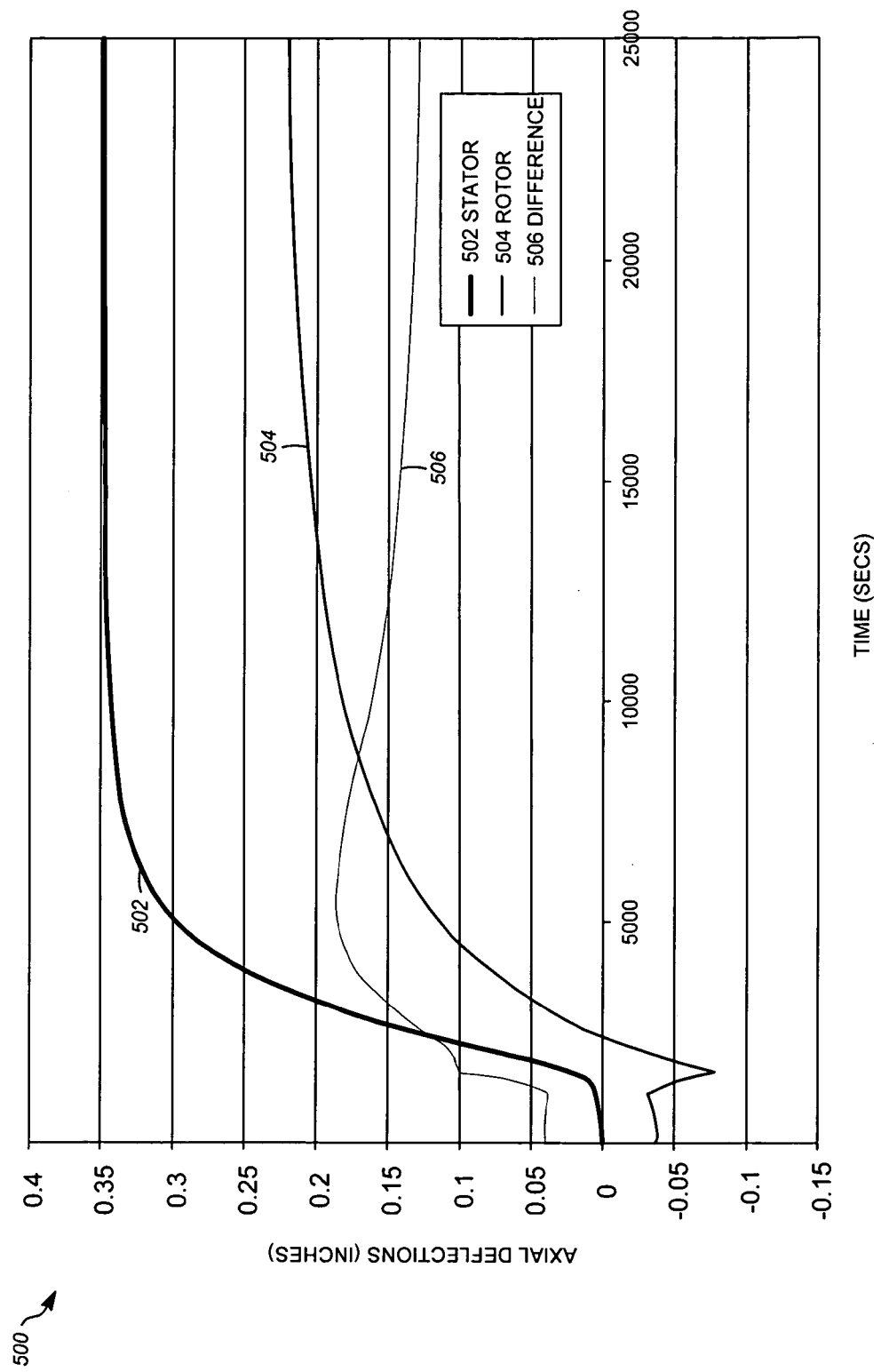

FIG. 5 is a diagram illustrating one example change in the axial deflections of a rotor, an associated stator and their relative axial deflections according to an illustrative embodiment of the invention.

Figure 6:
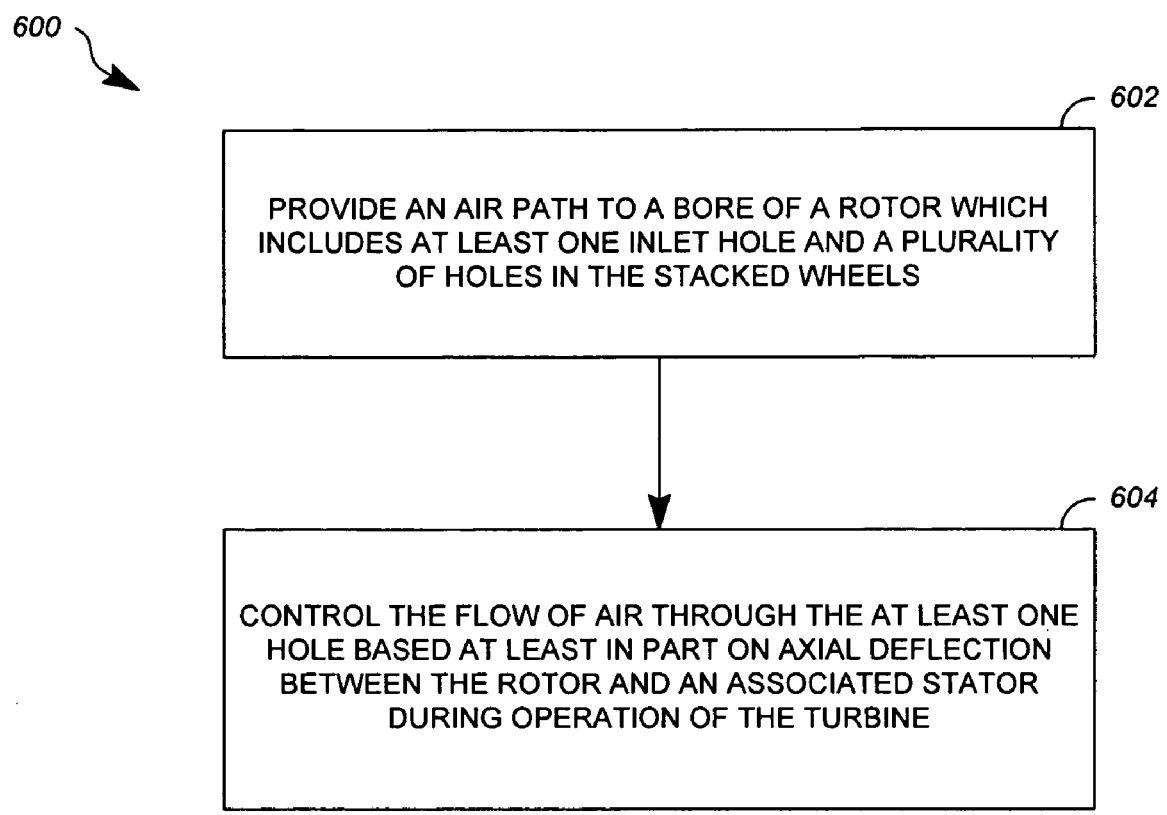

FIG. 6 is a flowchart illustrating one example method for controlling radial temperature gradients in a rotor of a gas turbine, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods and apparatus for passive purge flow control in a turbine including controlling radial temperature gradients in a rotor of a gas turbine. Various embodiments of the invention may include a sealing device for controlling air flow to at least one inlet hole on the rotor, operable to purge air to reduce the radial temperature gradients in the rotor. The purge air may heat up the bore of turbine wheels during startup of the gas turbine and subsequently cool the bore of turbine wheels during shutdown of the turbine. Flow control through the sealing device may be achieved based at least in part on axial deflection between the rotor and an associated stator during operation of the gas turbine. To accomplish the foregoing in certain embodiments of the embodiment, compressor discharge air may also be provided to the rotor bore and into the cavities between the turbine wheels of the rotor through an air flow path where the air flow path may include the inlet hole on the rotor and a plurality of holes in the turbine wheels of the rotor.

At least one technical effect of certain embodiments of the invention described herein is that an air flow path can be provided to the bore of a turbine rotor to control the radial temperature gradients in the rotor. This arrangement can improve the performance of the turbine by eliminating or otherwise minimizing the losses associated with the use of purged air for cooling/heating the rotor bore during steady state operation. Additionally, the sealing device used for controlling the flow of purged air can use the relative axial movement between the rotor and stator parts, wherein such movement occurs during operation of the turbine. Moreover, the design of the sealing device can ensure that the air flow is neither disturbed or otherwise is relatively unaffected due to the presence of the sealing device, thus ensuring minimal flow losses and relatively smooth flow through the turbine section. Therefore, the use of the sealing device to control the purge flow may have the technical effect of improving the performance of the turbine.

FIG. 1 is a diagram illustrating one example of a change in the rim-to-bore temperature gradient associated with a rotor of a gas turbine according to an illustrative embodiment of the invention. FIG. 1 shows a plot 100 representative of an example variance in the rim to bore temperature gradient of a turbine wheel during transient and subsequently steady state operation of the gas turbine. In the plot 100, the horizontal axis may represent duration (in seconds) of operation of the gas turbine. The operation duration of the gas turbine may include the time of transient operation such as startup duration, and the time of subsequent full load operation of the gas turbine. Further, the vertical axis may represent the radial rim-to-bore temperature gradient (in degrees Fahrenheit) in the turbine wheels of the rotor. The plot 100 shows a gradual rise in the rim-to-bore temperature gradient during the transient operation, such as in the startup period of the gas turbine. Subsequently, the curve attains a peak midway during the startup duration, at around approximately 1500 seconds and then falls off gradually as the gas turbine attains steady state or near steady state operation. In various embodiments of the invention, the nature of the curve in the startup duration may also be representative of the system behavior during shutdown of the gas turbine engine. The plot 100 shown in FIG. 1 remains relatively flat during the steady state or near steady state operation of the gas turbine signifying virtually no or little change in the rim-to-bore temperature beyond the full load point as the gas turbine approaches steady state or near steady state operation.

Typically, high rim-to-bore temperature gradients for a turbine wheel are controlled by using purge flows directed to the bore of the rotor during some or all of the operational cycle of the gas turbine. However, the efficiency of the turbine may be increased by suitably controlling the purge flow during different stages of operation of the turbine. Since, as shown in FIG. 1, the rim-to-bore temperature gradient settles to an acceptable value after full load time point, there is little or no requirement of purge air during the steady state or near steady state operation of the gas turbine. Air purged into the bore of the rotor during the steady state or near steady state operation keeps circulating in the turbine section thus affecting the efficiency of the turbine. However, purge flow may be required during shutdown of the turbine as temperature gradients can develop between the rim and the bore region owing to the relatively rapid cooling of the rim portion compared to the bore portion. An arrangement described as shown in FIG. 2 can be operable to control the purge flow directed to the bore of the rotor during different operational stages of the turbine, and hence may ensure relatively efficient use of the purge air.

FIG. 2 is a magnified cross-sectional side view of one example compressor section 200 of a gas turbine that may be utilized in accordance with various embodiments of the invention. FIG. 2 illustrates an example environment of one example compressor section 200 of a gas turbine. Additionally or alternatively, other embodiments of the invention may include a turbine section of a gas turbine as the example environment.

The example compressor section 200 illustrated in FIG. 2 may include two primary structures: a rotating structure 202 such as a rotor, and a static structure such as a stator 204. A plurality of stacked wheels (hereinafter referred to as turbine wheels) mounted on and forming part of the rotor 202, may include a plurality of solid wheels 206 arranged alternately between a plurality of annular wheels 208. Each turbine wheel further includes a plurality of buckets 210 (rotor blades) projecting radially outward from the rotor 202 while a plurality of nozzles 212 (stator blades) mounted on the stator 204 and projecting radially inward towards the rotor 202, may be positioned alternately between the buckets 210. Thus the plurality of rotor blades 210 and the stator blades 212 form a passage through which the air in compressor section 200 flows. Consequently, rim 214 of the rotor 202 is exposed to the hot gas path while bore 216 remains shielded from the hot gas flow, and forms the root of the rotor 202 touching the centerline axis 218. Thus a radial temperature gradient can exist between the rim 214 and the bore 216 of the rotor 202 which may lead to relatively extreme thermal stresses. To reduce the thermal stress on the rotor 202, the bore 216 of the rotor 202 may be heated during the startup of the gas turbine, while during shutdown of the engine; the bore 216 may be cooled to reduce the radial temperature gradient between the rim 214 and the bore 216.

Accordingly, an air flow path 220 may be provided from the hot gas flow path in the compressor section 200 to the bore 216, through the aft end of the rotor 202. The air flow path 220 may include at least one inlet hole 222 on a rotor structure, through which the air flow may be controlled by a sealing device 224. The air flow path 220 may further connect the inlet hole 222 to a plurality of holes 226 in at least some of the turbine wheels. Thus the air from the hot gas path may be directed in the bore 216 through a path around the annular wheels 208 and through the plurality of holes 226 in the solid wheels 206. According to an example embodiment, the portion of the purge air that follows the air flow path 220 may be derived from the compressor main air-flow path 230. The remaining portions of the main air may either go to combustor and the turbine section 232 or to cool/purge the turbine section 234.

Further in certain embodiments of the invention, the plurality of holes 226 which allow air flow to pass through the solid bore wheels 206 may be along or at an angle to the engine centerline axis 218. Additionally, in at least one embodiment, the plurality of holes 226 in the solid wheels 206 may be located between approximately 0.2*R and approximately 0.65*R from the central axis 218 of each wheel, where R is the rim radius of the solid wheels 206.

In various embodiments of the invention, the at least one inlet hole 222 which forms part of the air path 220 may be in flow communication with a cavity defined within the rotor 202, while the cavity may in turn be in flow communication with the plurality of holes 226 in the solid turbine wheels 206. The air flow path 220 thus directs flow from the hot gas path to the bore 216 through the inlet hole 222. Subsequently the air flow path 220 passes through the holes 226 in the solid wheels 206 and around the annular wheels 208 positioned alternately in between the solid wheels, thus forming a curved flow path known as a serpentine flow path. The serpentine flow path formed in the bore region of the rotor 202 can expose a relatively larger surface area along the length of the turbine wheels to the air flow. The increased exposure of the surface to the air flow leads to relatively more effective heating or cooling of the compressor wheel bore surface. Thus, the serpentine path can serve to more effectively reduce the radial temperature gradient between the rim 214 and the bore 216 of the rotor 202 during transient operation of the gas turbine.

FIG. 3 is a magnified cross-sectional side view of a part of a turbine section 300 in which control of purge flow may be achieved, in accordance with an embodiment of the invention. FIG. 3 shows an example sealing device 224 operable to control purge flow, in accordance with an embodiment of the invention. FIG. 3 illustrates a part of a turbine section 300 where the sealing device 224 is operable to control the purge flow through the inlet hole 222. The example sealing device 224 may be cantilevered from a plurality of circumferential locations on the stator 204. The sealing device 224, which is operable to control the purge flow, may include a plurality of spokes 302 cantilevered from the stator 204, with bristles 304 at the end which rub against the rotor 202. The bristles 304 may be mounted on the inner circumference of a sealing hub 308 which is supported by the plurality of spokes 302 at different circumferential positions. In an example embodiment of the invention, the sealing device 224 may be an axial-shaped ring with an axial width X1 of approximately 0.06 inches. Moreover, the sealing device 224 may be of any shape and may not be limited to an axial-shaped ring. In an example embodiment, the bristles 304 may be mounted at one end within a bristle pack 306, that may be mounted to the sealing hub 308. The bristle pack 306 may secure a ring of densely packed metal wires, or bristles 304. Within the bristle pack 306, the bristles 304 may be arranged at an angle in the direction of rotation of rotor. Bristle length can be around 1 inch, or 2.5 cm.

Typically, during startup and shutdown of the gas turbine, the rotor parts may undergo an axial deflection with respect to the stator parts due to a combination of temperature differential, associated thermal expansion, and load stresses. The relative axial deflection between the rotor and the stator parts is observed during startup and shutdown of the turbine. The transiently varying relative deflection however reaches a maximum during the full load time, and remains constant during the entire duration of the steady state or near steady state operation of the turbine. Thus, prior to, and during startup, the sealing device 224 held from the stator 204 may be positioned so that it does not block the at least one inlet hole 222, and heated air may flow to the bore portion. As the stator expands axially with respect to the rotor, the sealing device 224 held from the stator 204 may relatively move with respect to the rotor 202 and begin to cover and block at least a portion of the at least one inlet hole 222, thereby restricting the flow of the heated air to the bore region. As the turbine reaches the steady state or near steady state operation after the startup duration, the sealing device 224 may stop moving with respect to the rotor 202, and may continue to cover all or part of the inlet hole 222. During shutdown, the reversed relative axial deflection between the stator and rotor parts may allow the sealing device 224 to uncover at least part of the one inlet hole 222. In one example embodiment, the differential axial deflection between the rotor and the stator parts may be between approximately 0.1 to approximately 0.2 inches after startup and during steady state operation. For this example embodiment, the width X1 of the sealing device 224 bristles 304 may be approximately 0.04 to approximately 0.1 inches, and the first end of the sealing device 224 may be placed at a distance X2 of approximately 0.1 to approximately 0.2 inches from the inlet hole 222 before the gas turbine is started. According to another example embodiment, the width X1 of the sealing device 224 and bristles 304 may be approximately 0.06 inches, and the first end of the sealing device 224 may be placed at a distance X2 of approximately 0.18 inches from the first edge of the inlet hole 222.

FIG. 4 is an enlarged front view of the example sealing device 224 in accordance with an embodiment of the invention. FIG. 4 illustrates the front view 400 of the sealing device 224 shown in FIGS. 2 and 3. The example sealing device 224 shown in FIG. 4 includes one or more bristles 304 mounted within a bristle pack 306, and the bristle pack may mounted to an inner circumference of a sealing hub 308, surrounding the rotor 202. The outer circumference of the sealing hub 308 may be further mounted to one or more spokes 302, where the one or more spokes 302 may be mounted on an inner circumference of the stator 204. Thus, the sealing device 224 hangs from the stator 204 at certain circumferential points and is operable to move relative to the rotor and cover at least a portion of the at least one inlet hole (not shown in figure). At least a portion of the one inlet hole can be covered by the sealing device 224 when the one or more bristles 304 block the inlet hole and hence prevent air from flowing into the inlet hole. Further, the opening 402 between the one or more spokes can permit axial air flow between the rotor 202 and the stator 204. Thus when the sealing device 224 covers at least a part of the inlet hole (not shown in figure), the air flow in the turbine section can be directed axially between the stator and the rotor. However, during the transient operation of the turbine, part of the air flows axially through the openings 402 while the remaining flows through the inlet hole and into the bore of the rotor 202. Thus the design of the sealing device 224 can facilitate the relatively smooth flow of air in the turbine section and does not obstruct the axial flow of the air thus minimizing losses.

FIG. 5 is a diagram illustrating an example change in the axial deflections of a rotor, an associated stator and their relative axial deflections according to an illustrative embodiment of the invention. FIG. 5 shows a plot 500 representative of example axial deflections of a rotor and an associated stator of a gas turbine during transient and subsequently steady state operation of the gas turbine. In the plot 500, the horizontal axis may represent time duration (in seconds) of the transient operation such as startup duration, and the subsequent full load operation time of the gas turbine. Further, the vertical axis in plot 500 may represent the axial deflection between the stator and rotor parts of the turbine (in inches). The plot 500 shows three curves 502, 504 and 506. The curve 502 is representative of the axial deflection of the stator with time as the turbine moves from the startup state to the steady state or near steady state. Similarly the curve 504 is representative of the axial deflection of the rotor during the transient and steady state or near steady state operation of the gas turbine. The curve 506 however is representative of the relative axial deflection between the rotor and the stator. The curve 506 represents a gradual increase in the relative axial deflection between the rotor and the stator during the startup duration, and then subsequently shows relatively no change in the axial deflection with the onset of the steady state or near steady state operation of the turbine. In one example embodiment of the invention, the sealing device may be positioned in the turbine section prior to the start of the turbine such that the inlet hole may initially be uncovered upon startup, and may then be at least partially covered after a time of approximately 5000 seconds from the startup of the turbine.

FIG. 6 is a flowchart illustrating one example method 600 for controlling radial temperature gradients in a rotor of a gas turbine, according to an illustrative embodiment of the invention.

The method 600 may begin at block 602. At block 602, an air path is provided to a bore of a rotor, which includes at least one inlet hole and a plurality of holes in the stacked wheels. The rotor of a turbine can be formed of a plurality of stacked wheels which include solid wheels placed alternately in between annular wheels. The air path can provide an air passage from the hot gas path of the turbine to the bore of the rotor. The one or more inlet holes, which form a part of the air path, may be in communication with a cavity defined within the rotor. The cavity may be in further communication with the plurality of holes in the solid wheels. Thus, air from the hot gas path may be directed to the bore of the rotor through a serpentine flow path around the annular wheels and through the solid wheels. The serpentine flow path can lead to a relatively larger exposure of the surface area along the length of the turbine wheels to the air flow. This increased exposure of the rotor surface to the purge flow can lead to relatively more effective heating or cooling of the rotor, thus reducing the radial temperature gradient between the rim and the bore of the rotor more effectively during transient operation of the gas turbine. In various embodiments of the invention, the plurality of holes in the solid wheels may be located between about 0.2*R and about 0.65*R from a central axis of each wheel, where R is equal to the rim radius of the solid wheels. Following the design of an air path to the bore of a rotor, operations may proceed to block 604.

At block 604, the flow of purge air through the at least one hole may be controlled based at least in part on axial deflection the rotor and an associated stator during operation of the engine. During startup and shutdown of a turbine, there may result an axial deflection of the rotor parts with respect to the stator parts. This relative axial deflection between the rotor and the stator parts can increase with time during the startup of the turbine and reaches a maximum at the full load point. Beyond the full load point, the deflection between the rotor and the stator parts may remain almost constant during the entire duration of the steady state operation of the turbine. Further during shutdown, the relative axial deflection between the rotor and the stator parts can again change and decrease with time. Thus, during the transient states of operation, a sealing device held from an inner circumference of the stator may relatively move with respect to the rotor and cover at least a portion of the inlet hole. Further, as the turbine reaches the steady state or near steady state operation, the sealing device does not move with respect to the rotor, and thus continues to cover at least a part of the inlet hole during the steady state operation of the turbine. Thus, the sealing device may be operable to control the air flow to the inlet hole at all operational states of the gas turbine. In one example embodiment of the invention, the axial deflection between the stator and the rotor parts is approximately 0.01 inches to approximately 0.5 inches. Further in various embodiments of the invention, the sealing device can include one or more bristles mounted to an inner circumference of a sealing hub. The outer circumference of this sealing hub may be further mounted to one or more spokes where the one or more spokes may be mounted to the inner circumference of the stator. The relative movement between the rotor and the stator can facilitate the motion of the bristles on the rotor surface at least partially covering the inlet hole at the point of maximum axial deflection. Moreover, the spokes are circumferentially arranged such that axial air flow between the stator and rotor may be permitted thus resulting in minimum losses in the flow.

The method 600 may end following block 604.

The operations described in the method 600 of FIG. 6 do not necessarily have to be performed in the order set forth in FIG. 6, but instead may be performed in any suitable order in accordance with embodiments of the invention. Additionally, in certain embodiments of the invention, more or less than all of the elements or operations set forth in FIG. 6 may be performed.

Embodiments of the invention may be applicable to different types of turbines such as steam turbine, gas turbine and the like. Moreover the embodiments of the invention may also be used within different sections of a turbine such as turbine section or compressor section of a gas turbine. It will be apparent that any example taken or provided in the foregoing specification is merely provided for explanation purposes and does not limit the scope of the invention by any means.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method of controlling radial temperature gradients in a rotor of a gas turbine, the method comprising:

providing a path for air to flow to a bore of the rotor comprising a plurality of stacked wheels, wherein the path comprises at least one inlet hole on a rotor structure and a plurality of holes in at least some of the stacked wheels, and based at least in part on axial deflection between the rotor and an associated stator during operation of the gas turbine, controlling air flow to the at least one inlet hole, wherein at least a portion of the air flow is directed through the plurality of holes in the stacked wheels.

2. The method of claim 1, wherein the stacked wheels comprise solid and annular wheels, and wherein the air flow is directed through a path around the annular wheels and through the solid wheels.

3. The method of claim 2, wherein the plurality of holes in the stacked wheels are located between about 0.2*R and about 0.65*R from a central axis of each wheel, where R is equal to the rim radius of the solid wheels.

4. The method of claim 1, wherein the axial deflection is between about 0.01 and about 0.5 inches.

5. The method of claim 1, wherein the air flow to the at least one inlet hole is controlled by a sealing device.

6. The method of claim 5, wherein the sealing device held from stator can relatively move with respect to rotor and cover at least a portion of the at least one inlet hole.

7. The method of claim 5, wherein the sealing device comprises one or more bristles mounted to an inner circumference of a sealing hub, wherein an outer circumference of the sealing hub mounts to one or more spokes, wherein the one or more spokes mount to an inner circumference of the stator, and wherein openings between the spokes permit axial air flow between the stator and rotor.

8. A system for controlling radial temperature gradients in a rotor of a gas turbine, the system comprising:

an air flow path to a bore of the rotor comprising a plurality of stacked wheels, wherein the path comprises at least one inlet hole on a rotor structure and a plurality of holes in the stacked wheels; and a sealing device for controlling air flow to the at least one inlet hole based at least in part on axial deflection between the rotor and an associated stator during operation of the gas turbine, wherein at least a portion of the air flow is directed to purge at least one wheel through the plurality of holes in the stacked wheels.

9. The system of claim 8, wherein the stacked wheels comprise solid and annular wheels, and wherein the air flow is directed through a path around the annular wheels and through the solid wheels.

10. The system of claim 9, wherein the plurality of holes in the stacked wheels are located between about 0.2*R and about 0.65*R from a central axis of each wheel, where R is equal to the rim radius of the solid wheels.

11. The system of claim 8, wherein the at least one inlet hole on the rotor structure is in communication with a cavity defined within the rotor, wherein the cavity is in communication with a plurality of holes in the stacked wheels.

12. The system of claim 8, wherein the axial deflection is between about 0.01 and about 0.5 inches.

13. The system of claim 8, wherein the sealing device held from stator can relatively move with respect to rotor and cover at least a portion of the at least one inlet hole.

14. The system of claim 8, wherein the sealing device comprises one or more bristles mounted to an inner circumference of a sealing hub, wherein an outer circumference of the sealing hub mounts to one or more spokes, wherein the one or more spokes mount to an inner circumference of the stator, and wherein openings between the spokes permit axial air flow between the stator and rotor.

15. An apparatus for controlling radial temperature gradients in a rotor of a gas turbine, the apparatus comprising:

an air flow path to a bore of the rotor comprising a plurality of stacked wheels, wherein the path comprises at least one inlet hole on a rotor structure and a plurality of holes in the stacked wheels; and a sealing device for controlling air flow to the at least one inlet hole based at least in part on axial deflection between the rotor and an associated stator during operation of the gas turbine, wherein at least a portion of the air flow is directed to purge at least one wheel through the plurality of holes in the stacked wheels.

16. The apparatus of claim 15, wherein the at least one inlet hole on the rotor structure is in communication with a cavity defined within the rotor, wherein the cavity is in communication with a plurality of holes in the stacked wheels.

17. The apparatus of claim 15, wherein the axial deflection is between about 0.01 and about 0.5 inches.

18. The apparatus of claim 15, wherein the sealing ring axial width is between approximately 0.06 and 0.5 inches.

19. The apparatus of claim 15, wherein the sealing device held from stator can relatively move with respect to rotor and cover at least a portion of the at least one inlet hole.

20. The apparatus of claim 15, wherein the sealing device comprises one or more bristles mounted to an inner circumference of a sealing hub, wherein an outer circumference of the sealing hub mounts to one or more spokes, wherein the one or more spokes mount to an inner circumference of the stator and wherein openings between the spokes permit axial air flow between the stator and rotor.

* * * * *